United States Patent
Daniel et al.

(10) Patent No.: US 8,698,645 B2
(45) Date of Patent: *Apr. 15, 2014

(54) METHOD FOR EVENT SENSING EMPLOYING A PRINTED EVENT SENSOR

(75) Inventors: Jurgen H. Daniel, San Francisco, CA (US); Tse Hga Ng, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 719 days.

This patent is subject to a terminal disclaimer.

(21) Appl. No.: 12/907,891

(22) Filed: Oct. 19, 2010

(65) Prior Publication Data

US 2012/0092182 A1    Apr. 19, 2012

(51) Int. Cl.
*G08B 3/00* (2006.01)

(52) U.S. Cl.
USPC .................. 340/691.1; 345/156; 345/173

(58) Field of Classification Search
USPC ............... 340/691.1, 691.6, 815.4; 341/34; 345/156, 173, 174
See application file for complete search history.

(56) References Cited

U.S. PATENT DOCUMENTS

| | | | |
|---|---|---|---|
| 5,270,711 A * | 12/1993 | Knapp | 341/34 |
| 5,583,749 A | 12/1996 | Tredennick et al. | |
| 6,118,426 A * | 9/2000 | Albert et al. | 345/107 |
| 6,640,435 B2 | 11/2003 | Balakrishnan | |
| 7,570,231 B2 * | 8/2009 | Itokawa et al. | 345/68 |
| 8,184,107 B2 * | 5/2012 | Lee et al. | 345/174 |
| 8,432,370 B2 * | 4/2013 | Park et al. | 345/173 |

OTHER PUBLICATIONS www.vdma.org/wps/portal/Home/en/Branchen/O/OEA/?WCM_GLOBAL_CONTEXT=/vdma/Home/en/Branchen/O/OEA/.
www.novaled.com/downloadcenter/OE-A_Brochure2009_lowres.pdf.
www.vdma.org/wps/portal/Home/en/Branchen/O/OEA/?WCM_GLOBAL_CONTEXT=/vdma/Home/en/Branchen/O/OEA/, Aug. 2013.
www.novaled.com/downloadcenter/OE-A_Brochure2009_lowres.pdf, Dec. 2009.

* cited by examiner

*Primary Examiner* — Brent Swarthout
(74) *Attorney, Agent, or Firm* — Jonathan A. Small (57) ABSTRACT

A method for event sensing employs an event sensor comprising a detector and circuitry, connected thereto, produced by printed electronics processes. Operation may rely on fixed characteristic devices, such as a series resistive chain, or variable characteristic devices such as thin film transistors (TFTs) and the like. A pulse is input to the printed electronic circuitry. The printed electronic circuitry divides the pulse across the various devices comprising the circuitry according to pulse amplitude and pulse width. The circuitry provides an output signal which is provided to a plurality of display elements capable of indicating the division performed at the printed electronic circuitry. In one embodiment, each display element is an electrophoretic display which changes contrast as a function of the applied voltage. Not only the pulse amplitude and pulse width, but the number of pulses applied to the printed circuitry (i.e., sensed by the detector) may be indicated.

11 Claims, 10 Drawing Sheets

METHOD FOR EVENT SENSING EMPLOYING A PRINTED EVENT SENSOR

CROSS-REFERENCE TO RELATED FILINGS

The present disclosure is related to and claims priority from copending U.S. Patent Application titled "Event Sensor Including Printed Electronic Circuit", Ser. No. 12/907,880, filed on the same filing date and assigned to the same assignee as the present application, and further which, in its entirety, is hereby incorporated herein by reference.

BACKGROUND

The present disclosure is related to sensing methods, and more specifically to a method by which an electronic device formed by printing senses shock, inertial movement, pressure force, presence of light, chemicals, biologics, etc. and generates an electric pulse which is indicated on a dedicated display.

There are today a relatively large number of different techniques for producing electronic devices. One family of such techniques, of interest herein, is commonly referred to as printed electronics. Various methods fall within the definition of printed electronics. Screen printing, traditional and digital lithography, flexography, gravure and jet-printing are a number of the more common of such methods. In each case, a material, conductive, semi-conductive or insulating, is deposited over a substrate to form interconnected passive and and/or active electronic components. Printing processes typically deposit materials in form of a solution, a slurry or in form of a powder. However, also transfer processes such as thermal transfer or laser transfer processes may be used to print structures. In a thermal transfer process, a layer such as a metal film may be transferred from a carrier substrate to another substrate. Known printed electronic processes can utilize a wide variety of materials for these components, and are not limited to organic materials.

Printed electronic processes take advantage of known, relatively simple printing techniques, and are thus typically less expensive and often less environmentally hazardous than traditional lithography and deposition techniques. Certain materials and processes used for printed electronics permit printing on non-crystalline substrates, such as paper, plastic, fabric, etc. Such processes may permit printing on flexible substrates, which is not easily done with conventional electronic device fabrication techniques. Furthermore, printing processes have been developed for non-planar surfaces, which is also a challenge for conventional electronic device fabrication techniques. However, in order to maintain a low cost and/or substrate flexibility, the components produced by printed electronic processes are relatively large, and the circuits relatively simple. For this reason, and others, printed event sensor devices are not generally available today.

An event sensor, as used herein, is a device for detecting and indicating the occurrence, duration, and extent of an event or a series of events. Sensed events include acceleration, pressure force, exposure to light or other radiation, sound, and so forth. A relatively common event sensor is the accelerometer. Conventional accelerometers are typically based on mechanical or electromechanical components. For example, when a "proof" mass within the sensor is displaced, such as by acceleration or deceleration, often referred to as shock, that displacement is measured, and a signal issued in accordance therewith. More compact devices rely on strain gauges, in which current through a member is a function of the strain it experiences, micro-electro-mechanical (MEMs) devices, which are often very small proof masses, interleaved combs, and the like, and piezoelectric materials, in which strain results in generation of a charge within the material. The sensing signals issuing from these devices are commonly processed by additional electronic circuits for amplification, processing, display, and so on.

The applications for event sensors vary widely. However, a common requirement for many applications is low cost. There is a further common requirement for many applications that the sensor and even the display mechanism be flexible, for example permitting it to be applied over a non-planar structure, such as a medicine bottle, shipping package, etc. Still further, in some applications it is desirable to provide a sensor without a separate voltage source (e.g., without a battery).

Present event sensors are not capable of meeting these requirements. The majority of known systems do not provide both a low cost sensor and a low cost display in a single circuit. Furthermore, most low cost shock sensing systems are configured to indicate whether a threshold level of shock has been exceeded. Still further, common shock sensing systems do not provide field replaceable elements such as display portions and the like. And common electronic shock sensors require a battery or similar separate voltage source.

SUMMARY

Accordingly, the present disclosure is directed to methods providing simple, low-cost sensors with displays. A device according to the present disclosure comprises a sensor and circuitry, connected thereto, produced by printed electronics processes. This circuitry may be comprised of fixed characteristic devices, such as a series resistive chain, or variable characteristic devices such as thin film transistors (TFTs) and the like. A pulse is input to the printed electronic circuitry. The printed electronic circuitry divides the pulse across the various devices comprising the circuitry according to pulse amplitude and pulse width. The circuitry provides an output signal which is provided to a plurality of display elements, which are capable of indicating the division performed at the printed electronic circuitry. In one embodiment, each display element is an electrophoretic display which changes contrast as a function of the applied voltage. Not only the pulse amplitude and pulse width, but the number of pulses applied to the printed circuitry (i.e., sensed by the detector) may be indicated. Accordingly, the sensor, circuitry, and display of the present disclosure also operates as an event counter, for example providing a visual indication of the cumulative number of events detected.

One or more elements of the system may be fabricated by printed electronics processes. In one embodiment, the circuitry is fabricated by printed electronics processes. In another embodiment, the detector and circuitry are fabricated by printed electronics processes. In still another embodiment at least a portion of the display elements, the detector, and the circuitry are fabricated by printed electronics processes.

The display elements are driven by a display voltage which may be provided by a voltage source, modulated for example by the detector providing a pulse in response to a detected event. Alternatively, the voltage source and detector may be integrated together as one in the same element (such as a piezoelectric beam or the like), with the display voltage provided directly as a part of the pulse from a sensed event (such as physical strain due to acceleration, pressure or shock).

Event detectors according to the present disclosure may be integrated into packaging (e.g., for determining whether a package has experienced shock above a certain threshold, such as when dropped, or when attached to the cap of a medicine package, to indicate whether the package has been tampered), applied to a body (e.g., for counting movement such as steps), part of a dedicated sensor apparatus (e.g., sensing the presence of a certain chemical or biological agent in a sample), etc.

Accordingly, a method of indicating the occurrence of a sensed event is disclosed, comprising: sensing an event at an event sensor; producing a voltage pulse in response to said sensed event; providing said voltage pulse to a printed voltage dividing circuit, said printed voltage dividing circuit divided into a plurality stages, each said stage having an input node connected to receive said voltage pulse, an output node, and a voltage passing circuit electrically connecting said input node and said output node of said stage; providing a voltage at said output node of each said stage to one of a plurality of variable characteristic display elements such that the voltage may change the characteristic of said display element in accordance with said voltage pulse; and indicating by way of said display characteristics of said plurality of variable characteristic display elements the occurrence of a sensed event. As an alternative to a display, the method may provide the voltage at said output node to other signal processing elements prior to display.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that descriptions of well known starting materials, processing techniques, components, equipment and other well known details are merely summarized or are omitted so as not to unnecessarily obscure the details of the present disclosure. Thus, where details are otherwise well known, we leave it to the application of the present disclosure to suggest or dictate choices relating to those details.

Figure 1:
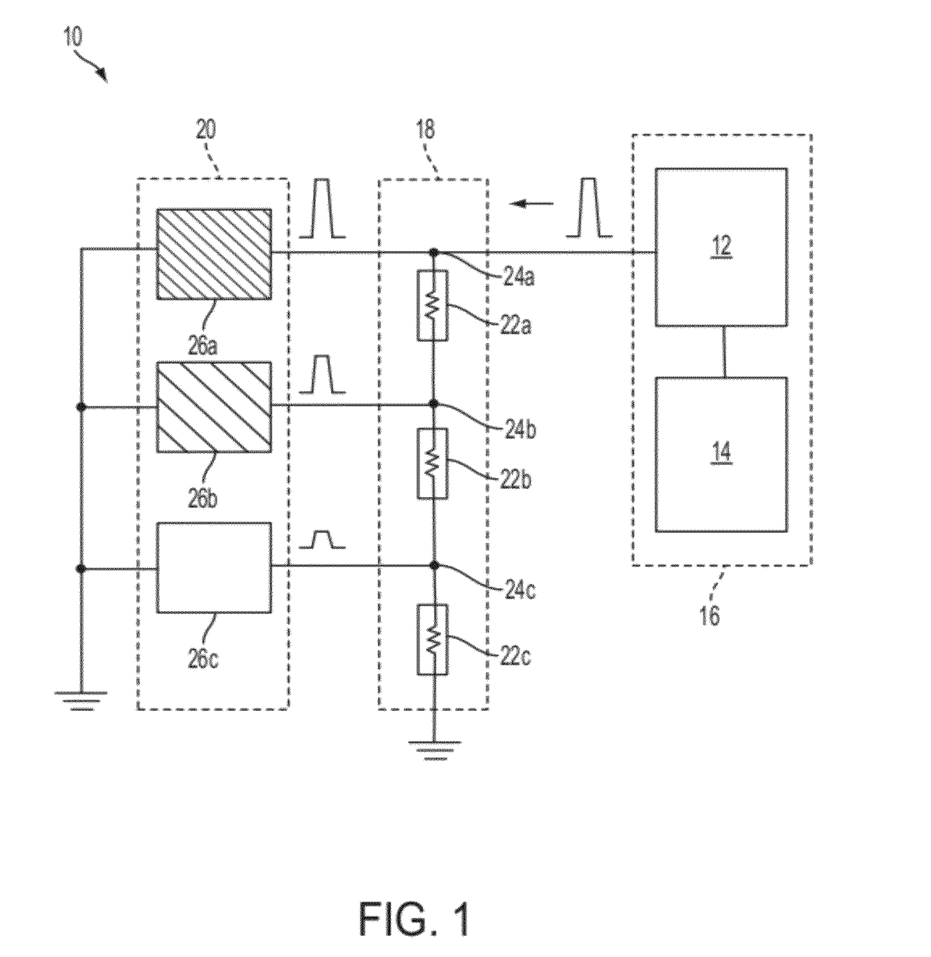
FIG. 1 is a schematic illustration of a pulse generator (event detector and voltage source) and display including a series resistive chain printed voltage dividing circuit according to one embodiment of the present disclosure.

With reference to FIG. 1, there is shown an event sensor device 10 according an embodiment of the present disclosure. Event sensor device 10 comprises a detector 12 for detecting an occurrence of an event of interest. A wide variety of detectors for detecting a wide variety of events are contemplated by the present disclosure. For example, detector 12 may comprise a piezoelectric material formed and configured for detecting an inertial shock such as acceleration or deceleration. The piezoelectric material may be in the form of a deflecting membrane, and have associated therewith a proof mass to assist with such detection. The piezoelectric material may also be formed and configured for detecting pressure change, temperature change, and so on. Detector 12 may be a radiation sensor, such as for sensing light, for example which changes conductivity when radiation of a selected wavelength is incident thereon. Still further, detector 12 may be a material for detecting presence or absence of a chemical, molecule, compound or the like, for example which changes conductivity in the presence or absence of the chemical, molecule, compound or the like. It will be understood that the operation of detector 12, and the event which it detects, does not form a limitation on the scope of the present disclosure or claims hereof.

In event sensor device 10, detector 12 modulates the application of a voltage pulse provide by voltage source 14, such as a battery. Together detector 12 and voltage source 14 form a pulse generator 16. In certain embodiments, detector 12 and voltage source 14 are a single element, and in other embodiments detector 12 and voltage source 14 may be separate elements of pulse generator 16. The voltage pulse provided will have a pulse amplitude (height) and pulse width which may depend on the magnitude and duration of the event detected.

The voltage pulse is provided to a printed voltage dividing circuit 18 responsive to the amplitude and width of the pulse. Printed voltage dividing circuit 18 in turn provides a driving signal for driving a processing circuit 20, such as a graduated display. In the embodiment shown in FIG. 1, printed voltage dividing circuit 18 comprises a resistor chain comprised of a plurality of resistors 22a, 22b, 22c. It will be appreciated that a voltage dividing function can also be provided by other elements such as transistors, capacitors, diodes, etc. as will be appreciated by one skilled in the art. Elements 26a, 26b, 26c may each be of the same design and material, or one or more may be different. The resistors are arranged such that the chain provides ascending resistance. While three resistors 22a, 22b, 22c are shown and described to comprise printed voltage dividing circuit 18, other numbers of resistors, such as two or more, may be provided. Furthermore, while resistors are shown in this example, a wide range of other elements may be assembled to form voltage dividing chains, as will be appreciated by one skilled in the art. Each resistor 22a, 22b, 22c is connected to a node 24a, 24b, 24c, respectively, at which a voltage pulse is provided. At node 24a, the pulse (amplitude and width) is that provided at the output of pulse generator 16. At node 24b the amplitude of the pulse has been reduced by resistor 22a. At node 24c the amplitude of the pulse has been further reduced by the series combination of resistors 22a and 22b.

Circuit 18 is preferably produced by way of a printed electronics process. We define "printed electronic process" for the purposes of this disclosure to exclude traditional photoresist-based process involving depositing, masking, exposing, etching, and further depositing (e.g., vacuum-based electronic fabrication techniques often referred to generally as photolithography). Examples of printed electronic process within the scope of this definition include screen-printing; traditional lithography; digital lithography; flexography; gravure; and inkjet-printing. In particular printed electronic processes may include additive deposition processes where all the layers of the circuit are patterned by selectively depositing materials where required without removing substantial amounts of other materials. Processes may include laser and heat transfer printing, nanoimprinting, pad printing, aerosol printing as well as continuous coating processes such as dip coating, spray coating, extrusion coating, slot coating, doctorblading and lamination. A printing process may include materials removal processes such as for trimming purposes or for patterning of via interconnects. Such processes may include laser ablation, die cutting or printing of solvents. Other processes not listed may also be within this definition. A circuit produced by a printed electronic process is referred to herein as a "printed electronic circuit."

Printed voltage dividing circuit 18 is an example of such a printed electronic circuit. The precise variant of the printed electronics process is not a critical component in most embodiments of the present disclosure. Rather, the selected process must be consistent with the substrate on which the electronics are being formed (e.g., paper, plastic, fabric, etc.), be of low cost, and be able to produce a large quantity of devices. Likewise, the materials used by the process are not a critical component in most embodiments of the present disclosure. Rather, the selected materials must be consistent with the selected process, and again enable low cost, high volume production. In one example, circuit 18 is printed by screen printing a resistive ink such as carbon based Electrical Resistor Ink (product #104-18) from Creative Materials, Inc. of Tyngsboro, Mass. The resistive elements are then connected to each other and to other circuit elements by screen printing silver Electrically Conductive Ink (product #101-42) from Creative Materials, Inc.

Nodes 22a, 22b, 22c are connected to display elements 26a, 26b, 26c, respectively, of processing circuit 20. In the case of electrostatic displays such as electrophoretic displays, display elements 26a, 26b, 26c are effectively capacitors able to provide an indication of the field applied thereto. In one embodiment, that indication is visual, such as a grayscale display. In other embodiments, the indication may be audible, thermal, haptic (tactile), etc. Display elements 26a, 26b, 26c may be produced in whole or in part by printed electronics processes. Elements 26a, 26b, 26c may each be of the same design and material, or one or more may be different. While three elements 26a, 26b, 26c are shown and described, other than three such elements can be provided (more than two), in count corresponding the number of resistors in circuit 18, as described above. A greater number of such elements (and corresponding resistors) can, for example, provide a finer gradation between indicated sensed pulse levels.

In the embodiment shown in FIG. 1, elements 26a, 26b, 26c are electrophoretic. These elements contain small, mobile particles that migrate in the presence of an electric field. The amount of particle movement, and hence the visible contrast or change in color or tone with the application an electric field, is a function of the duration and magnitude of the field. Thus, the greater the amplitude and/or width of the pulse at node 24a, 24b, 24c, the greater the visual contrast of the corresponding element 26a, 26b, 26c. As element 26a sees essentially the signal issued by pulse generator 16, its contrast will change if the pulse height/width from pulse generator 16 are sufficiently large. Element 26b sees a smaller pulse height/width at node 24b, and hence will show visibly less contrast change than element 26a for a given pulse from pulse generator 16. Likewise, element 26c sees an even smaller pulse height at node 24c, and hence will show still less visible contrast change than elements 26a, 26b for a given pulse from pulse generator 16. By providing a calibration reference in association with the graduated display of processing circuit 20, the number of elements 26a, 26b, 26c showing contrast change, and the extent of that change for each element can indicate the number of events that have been sensed. In one example, the bottom electrode pads for the electrophoretic elements 26a-c may be screen printed, e.g., with conductive silver ink. The electrophoretic medium, such as Vizplex film from E-ink Corporation, may be laminated onto the electrode. The top electrode of the electrophoretic film may be connected to printed lines on the substrate by electrically conductive adhesive such as b-stageable, electrically conductive epoxy adhesive (product #118-06) from Creative Materials, Inc.

While electrophoretic display elements have been described above, other display types may similarly be employed. For example, liquid crystal, electrochromic, electrowetting, light emitting (e.g., organic LED), electrochemical, and other forms of displays may be used. In some of these cases, the voltage may operate switching circuits, such as thin film transistors (TFT) used to regulate the application of an appropriate driving current representative of the voltage at the various nodes 24a, 24b, 24c.

Detector 12 may detect a number of individual events, which may result in a single cumulative pulse by way of an integrator or the like (not shown). Similarly, pulse generator 16 may provide a number of discrete voltage pulses modulated by detector 12, and a single cumulative pulse provided by way of an integrator or the like. Alternatively, for certain electrophoretic display, the particle migration may be cumulative for the application of several sequential field applications. Thus, the "number" of pulses sensed and indicated may correspond to the degree of a sensed event, such as acceleration, or shock. The display can therefore provide an indication of the degree of shock to which the sensor has been subjected. When the sensor is applied to a shipping container, for example, the amount of shock that the container has been subjected to can be indicated. Or the number of times a package has been dropped can be indicated.

In the description of the embodiment above it has initially been assumed that printed voltage dividing circuit 18 is fabricated by an appropriate printed electronics process. While in certain embodiments only printed voltage dividing circuit 18 is fabricated by a printed electronics process, in other embodiments other elements of event sensor device 10 are also fabricated by a printed electronics process. For example, portions or all of pulse generator 16 may be formed in the same process used to form printed voltage dividing circuit 18. Furthermore, portions or all of processing circuit 20 may similarly be fabricated by a printed electronics process. In one embodiment of a method for fabricating event sensor device 10, all elements of the circuit are fabricated by a single, common printed electronics process in order to simplify manufacturing and reduce cost.

Furthermore, in the description of the embodiment above pulse generator 16 was described as comprised of a separate detector 12 and voltage source 14. However, according to an embodiment of the present disclosure, pulse generator 16 may be comprised of a single, combined detector 12 and voltage source 14. Unlike the embodiment in which detector 12 serves as a switch or modulator for a voltage supplied by voltage source 14, a single element produces a pulse which can be output from pulse generator 16. For example, pulse generator 16 may be a piezoelectric material that generates a voltage in response to physical strain within its structure. An example of a material that may be employed in this embodiment is piezoelectric (or pyroelectric) polyvinylidene fluoride (PVDF). The PVDF may be a film, with or without a proof mass. When strained (e.g., by deflection), polarized PVDF will produce a net charge. That charge may appear as a pulse at nodes 24a, 24b, 24c which may be displayed via the graduated display described above. In this way, no separate voltage is required—the detector itself provides the pulse for sensing.

The PVDF film may be laminated to the substrate. The PVDF film may previously have been metalized on both sides such as the PVDF films available from Measurement Specialties, Inc. In this case, the bottom electrode of the PVDF film may be bonded onto a printed electrode pad on the substrate with conductive epoxy ink. The connection to the top electrode of the PVDF material may be made by printing a conductive line between the top electrode and the connecting circuit. Alternatively, a PVDF copolymer such as PVDF-TrFE (trifluoroethylene) may be used. PVDF copolymers can be deposited from a solution and therefore are printable. Similar to PVDF, they need to be polarized by corona charging or electrical poling by directly applying a voltage in order to give them piezoelectric properties. In either case, the bottom and top electrodes of the piezoelectric material may be printed, e.g. screen printed. Of course, other known piezoelectric materials may also be used.

PVDF may also be used in appropriate embodiments to provide single-element temperature sensing in a manner similar to that described above. Other known pyroelectric materials may also be employed. Known optoelectric materials such as a blend of organic n- and p-type semiconductors, such as Phenyl-C61-buryric acid methyl ester (PCBM, a bucky ball derivative) and poly(3-hexylthiophene), respectively can provide similar functionality when sensing optical radiation. Magnetoelectric structures, such as a printed spiral inductor coil, may also provide similar functionality for sensing the presence or absence of a magnetic field. The coil will generate a voltage pulse when a magnetic material is swiped past it. A magnetic core may be attached to the coil in order to increase the inductance of the coil. Bioelectric (e.g., changing conductivity in the presence of a selected biological agent) and chemoelectric (e.g., changing conductivity in the presence of a selected chemical element or compound agent) materials can further provide similar functionality. Piezoresistive materials such as elastomers with embedded conducting particles in which the percolation path changes upon pressure may be used to sense pressure. Combinations of these difference-sensing materials may also form embodiments of event sensor device 10 as contemplated by the present disclosure. While not shown, it is contemplated that the output of pulse generator 16 may also be amplified or otherwise processed prior to application to circuit 18.

Figure 2:
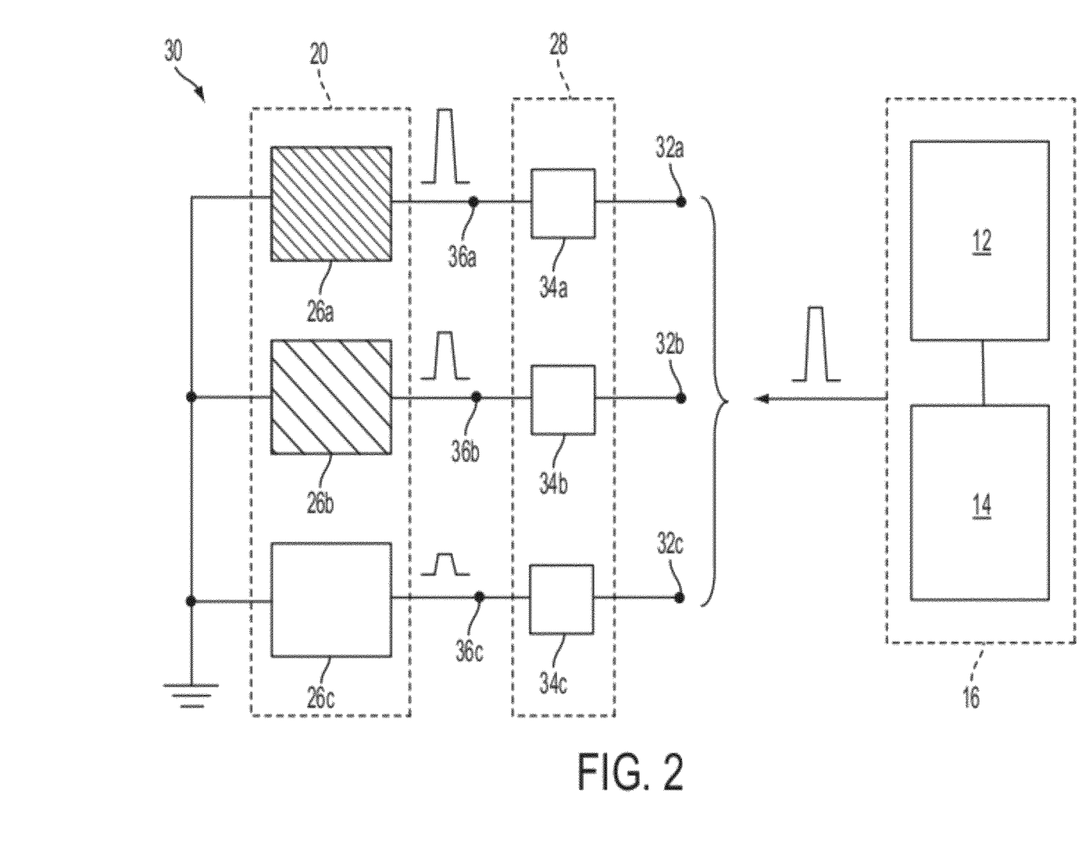
FIG. 2 is a schematic illustration of a pulse generator (event detector and voltage source) and display including a variable characteristic printed voltage dividing circuit, where the variable characteristic is variable resistance, according to another embodiment of the present disclosure.

A number of additional circuit designs are possible given the basic concepts presented above. FIG. 2 illustrates one such additional circuit design 30 in which each voltage pulse causes a change in an electronic component. Circuit 30 comprises a plurality of input nodes 32a, 32b, 32c each communicatively connected to receive a pulse from pulse generator 16. Nodes 32a, 32b, 32c are each communicatively connected to a printed voltage dividing circuit 28, which itself comprises a plurality of variable characteristic devices which are in this embodiment voltage divider stages 34a, 34b, 34c, respectively, described further below. Each voltage divider stage 34a, 34b, 34c is communicatively connected to an output node 36a, 36b, 36c, respectively.

Figure 3A:
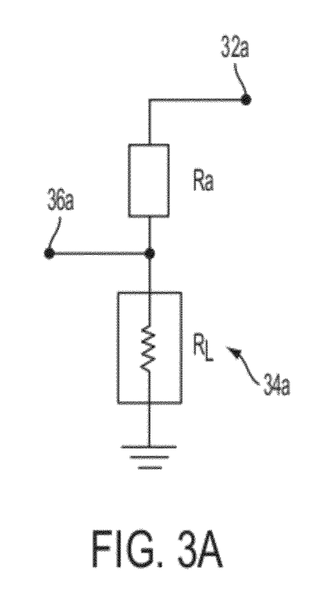
FIG. 3A is a representative schematic illustration of a variable resistance voltage divider stage according to an embodiment of the present disclosure.
Figure 3B:
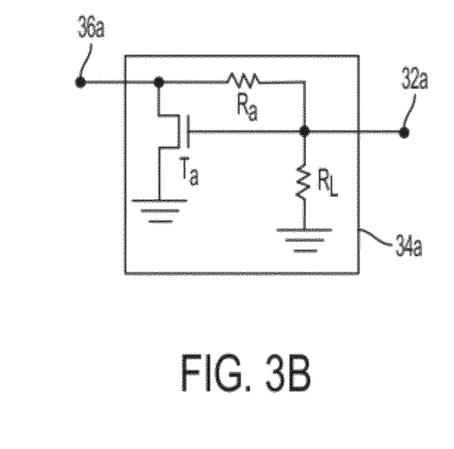
FIG. 3B is an example of a circuit for realizing the variable resistance voltage divider stage according to an embodiment of the present disclosure.

FIG. 3A is a representative schematic illustration of a variable resistance voltage divider stage. FIG. 3B is an example of a circuit for realizing the variable resistance voltage divider stage. With reference to FIG. 3B, a sample voltage divider stage 34a is illustrated (voltage divider stages 34b, 34c may be of similar design, or one or more may differ from the others). Voltage divider stage 34a comprises a threshold resistor $R_a$, a transistor element $T_a$, and a reference resistor $R_L$. In operation, the electric field associated with the voltage pulse from pulse generator 16 causes a threshold voltage shift in the transistor, making the channel of the transistor more resistive or more conductive. (Threshold voltage shift of the transistor may be caused by various effects such as ion movement, charge trapping or charge injection.) The amount of threshold voltage shift (and the direction) due to a pulse may be varied by choice of semiconductor materials, by varying the material for the gate dielectric or by adjusting the thickness of the gate dielectric. The more pulses transistor $T_a$ sees, the greater the change of its conductivity. This change will then alter the voltage at nodes 36a, 36b, 36c, and ultimately at display elements 26a, 26b, 26c. While the variable characteristic devices are described above as based on the channel conductivity of a TFT, other types of variable characteristic devices are within the scope of this disclosure, as discussed further below.

Returning to FIG. 2, the voltage pulse from pulse generator 16 is seen by the series of voltage divider stages 34a, 34b, 34c. These voltage dividers may represent a high impedance input for the signal. The voltage pulse is divided across voltage divider stages 34a, 34b, 34c according to their resistance values. The resistance in the voltage dividers increases or decreases when a voltage pulse is applied—the degree of change is different for each of voltage divider stages 34a, 34b, 34c based on the values of $R_a$, $R_b$, and $R_c$ (FIG. 3B). In this example, the resistance of voltage divider stage 34a may change slowest (requiring a relatively large number of pulses, pulse amplitude, and/or pulse width) and that of voltage divider stage 34c may change the fastest (requiring the least number of pulses, pulse amplitude, and/or pulse width). The attached display elements may then change contrast, for example, to a greater degree with increasing voltage. It should be noted that a grayscale can be achieved from display elements 26a, 26b, 26c by providing voltage dividers 34a, 34b, 34c with fixed values of decreasing ratio from 34a to 34b to 34c. In this case, the display element that experiences the lower voltage levels requires more pulses to change, e.g., from black to white. However, if the ratio of the voltage dividers 34a, 34b, 34c changes with the number of pulses, the voltage level of the pulses seen by the display elements may initially be below a threshold and gradually the voltage level becomes higher, exceeding that threshold. If the display elements 26a, 26b, 26c have a switching threshold (a minimum required voltage to cause any change at all) then the variable nature of elements 34 can cause the voltage pulse on the display to increase from below threshold to above threshold. This non-linearity is useful for displaying the number of events or the extent of an event more accurately. When the display elements 26a, 26b, 26c are electrophoretic, the above-described display of the relative level of node voltages is provided, which may be calibrated against a reference to indicate the number of events (or extent of an event) detected.

While FIG. 2 shows a circuit based on a variable resistance circuit, other circuit elements may also or alternatively be employed. For example, TFT $T_a$ may be replaced by a capacitor such that a change in its properties (e.g., change in capacitance, breakdown voltage, etc.) results in voltage at nodes 36a, 36b, 36c. Other changes in properties by alternative devices may also be employed.

Figure 4:
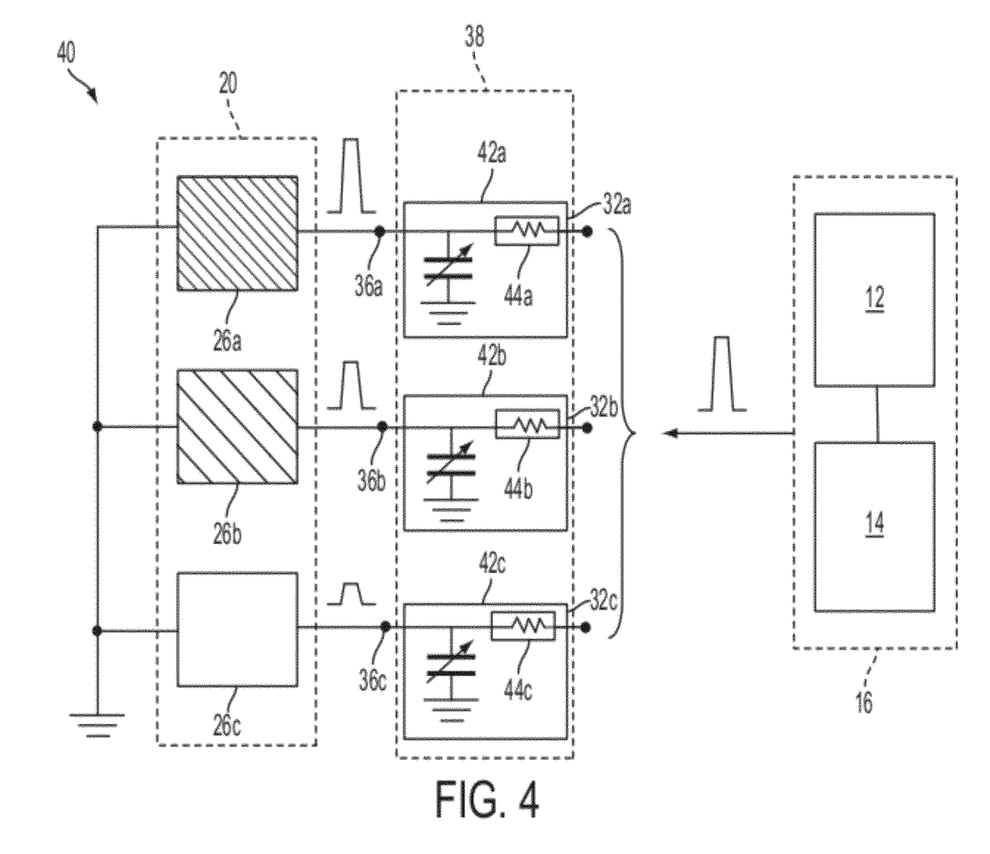
FIG. 4 is a schematic illustration of a pulse generator (event detector and voltage source) and display including a variable characteristic printed voltage dividing circuit, where the variable characteristic is variable capacitance, according to yet another embodiment of the present disclosure.

FIG. 4 illustrates another additional circuit design 40 in which each voltage pulse causes a change in an electronic component. Circuit 40 comprises a printed voltage dividing circuit 38, which itself comprises a plurality of variable characteristic devices, which in this embodiment are variable capacitance circuits 42a, 42b, 42c each communicatively connected via nodes 32a, 32b, 32c to receive a pulse from pulse generator 16. Each variable capacitance circuit 42a, 42b, 42c is communicatively connected to an output node 36a, 36b, 36c, respectively. The capacitance of each variable capacitance circuits 42a, 42b, 42c changes (e.g., due to ion movement within the capacitor caused by an applied electric field) with the pulse amplitude, pulse width, and number of pulses from pulse generator 16 such that the RC constant of each of the variable capacitance circuits changes. Thus, with decreasing capacitance as between variable capacitance circuits 42a, 42b, 42c, the voltage level on the display elements to which each variable capacitance circuit is connected increases. The attached display elements may then change contrast, for example, to a greater degree with increasing voltage. When the display elements 26a, 26b, 26c are electrophoretic, the above-described display of the relative level of node voltages is provided, which may be calibrated against a reference to indicate the number of events (or extend of an event) detected. The capacitors may be printed by printing the electrodes using metal ink such as ink made of silver nanoparticles. The dielectric layer between the capacitor plates may be a polymer such as PVA (polyvinylalcohol) and it may be also printed (e.g., using inkjet or flexographic printing).

Figure 5:
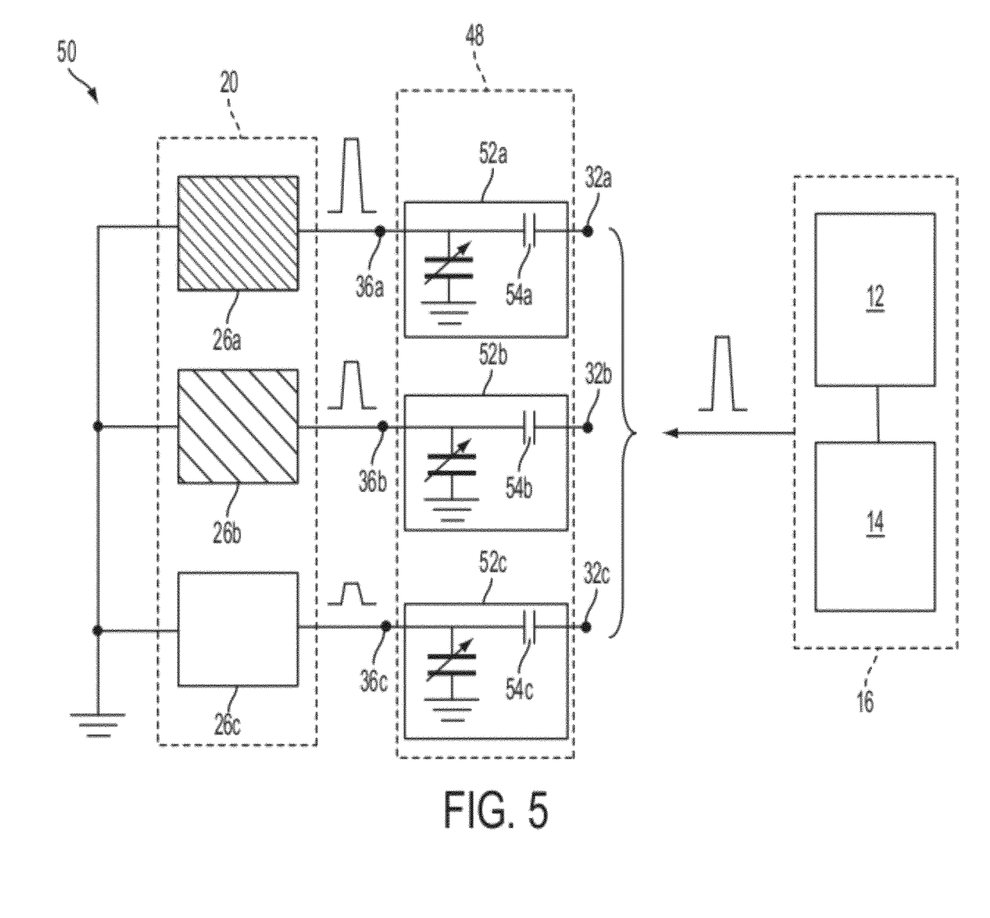
FIG. 5 is a schematic illustration of a pulse generator (event detector and voltage source) and display including a variable characteristic printed voltage dividing circuit, where the variable characteristic is variable capacitance, according to still another embodiment of the present disclosure.

FIG. 5 illustrates yet another circuit design 50 in which each voltage pulse causes a change in an electronic component. Circuit 50 comprises a printed voltage dividing circuit 48, which itself comprises plurality of variable characteristic devices, which in this embodiment are plurality of variable capacitance circuits 52a, 52b, 52c each communicatively connected via nodes 32a, 32b, 32c to receive a pulse from pulse generator 16. Each variable capacitance circuits 52a, 52b, 52c is communicatively connected to an output node 36a, 36b, 36c, respectively. In this embodiment, resistors such as 44a, 44b, 44c of the circuit of FIG. 4 are replaced with capacitors such as 54a, 54b, 54c. Again, the capacitance of each variable capacitance circuit 52a, 52b, 52c changes with the pulse amplitude, pulse width, and number of pulses from pulse generator 16. Display elements 26a, 26b, 26c may change contrast, for example, to a greater degree with increasing voltage at nodes 36a, 36b, 36c. This contrast level may be calibrated against a reference to indicate the number of events (or extent of an event) detected.

Figure 6:
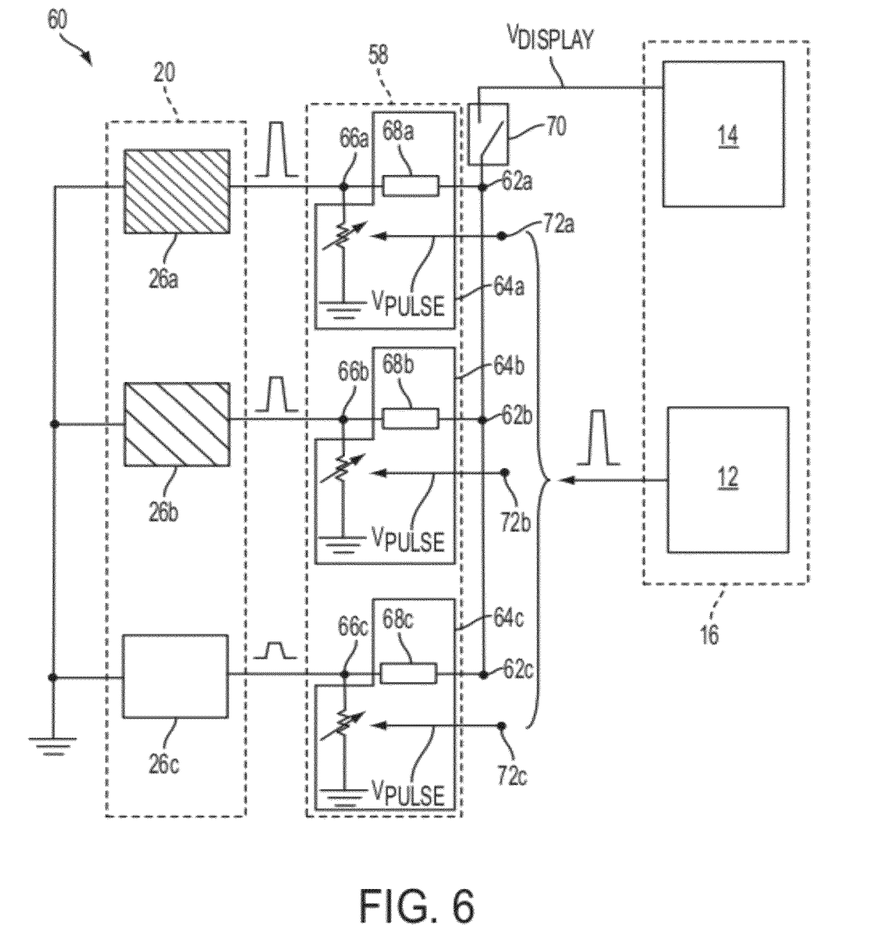
FIG. 6 is a schematic illustration of an event detector, voltage source, and display including a variable characteristic printed voltage dividing circuit, where the variable characteristic is variable resistance, according to another embodiment of the present disclosure.

In certain embodiments it may be desirable to operate the printed circuitry driving the display by way of a display voltage, switched by a separate sensor. Such a circuit 60 is illustrated in FIG. 6. According to this embodiment, voltage source 14 is connected through switch 70 to provide a display voltage to each of input nodes 62a, 62b, 62c. Voltage source 14 may be a battery, an AC supply source, a piezo element, etc. Printed voltage dividing circuit 58 comprises a plurality of variable characteristic devices, which in this embodiment are a plurality of variable resistance voltage dividers 64a, 64b, 64c provided between input nodes 62a, 62b, 62c and output nodes 66a, 66b, 66c. A voltage pulse is provided by detector 12 to each of divider nodes 64a, 64b, 64c, which controls the voltage from voltage source 14 flowing to display elements 26a, 26b, 26c.

Figure 7:
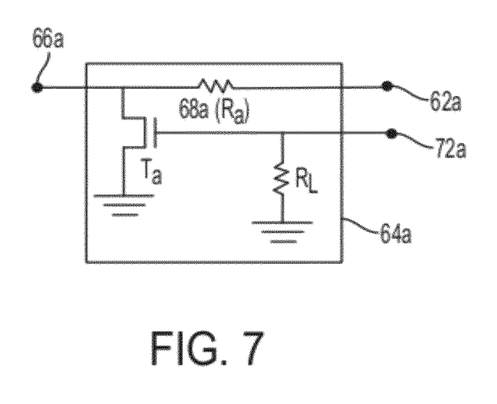
FIG. 7 is an example of a circuit for realizing the variable resistance voltage divider stage according to another embodiment of the present disclosure.

Referring to FIG. 7, an example of a specific variable resistance voltage divider is shown. In this embodiment, a voltage pulse provided at divider node 72a controls the conductivity of the channel of TFT $T_a$. This conductivity controls the current between input node 62a and ground, which in turn controls the voltage at node 66a that may be presented to a display element (not shown). Returning to FIG. 6, each of the variable resistance voltage dividers 64a, 64b, 64c may be of a similar construction to that illustrated in FIG. 7, with the values of $R_L$ and/or $R_a$ adjusted such that each divider 64a, 64b, 64c requires a successively higher voltage pulse (greater pulse amplitude, pulse width, and/or number of pulses) in order to provide a certain voltage at nodes 66a, 66b, 66c, respectively. This arrangement of separate detector 12 and voltage source 14 permits the display driving voltage to be lower than the sensor pulse voltage, or vice-versa. In one example, the low drive voltage may be sufficient to drive a display such as an OLED display, an electrochemical display or electrochromic display and the drive voltage can be applied for a relatively long time. The simple pulse drive described earlier requires a bistable display medium such as an electrophoretic display medium. Non-bistable displays such as many liquid crystal displays, OLED displays or electrochromic displays require an applied voltage for the display state to be maintained (i.e., during the time when a message is displayed). Also, some of these displays require relatively high currents (current driven displays). In such a case, the simple pulse may not be sufficient. The separate power source 14 may be able to provide sufficient current to drive a display, such as an OLED display, and the message may be read out as long as the switch 70 is closed. An additional benefit of this concept may be that the message or display pattern can be read out only when desired, but it may otherwise be invisible, such as beforehand during the recording time. This may be of advantage for keeping the information secure. In a specific example, power source 14 may be a printed battery such as a printed Zinc Manganese battery. Power source 14 may also consist of an inductor coil with rectifier and the power may be supplied by electromagnetic induction. In particular, the coil and or the rectifier may be printed. The switch 70 may also be printed and may consist of a conductive carbon layer which is brought into press contact with two conductive traces on the substrate, thereby establishing electrical connection between the traces.

As an alternative to the above-described embodiment, one or more of the dividers 64a, 64b, 64c may be of a different construction, but provide the same stepped increase in required pulse voltage from detector 12 to produce a set display element response. For example, in place of TFT Ta, a variable capacitance or resistance can be employed, with the separate voltage source and sensor circuit described above. Accordingly, an event sensor device is provided such that, for example, a grayscale indication at display elements 26a, 26b, 26c can be compared to a calibrated reference and a quantitative indication of event level, e.g., magnitude of shock, can be obtained.

Figure 8:
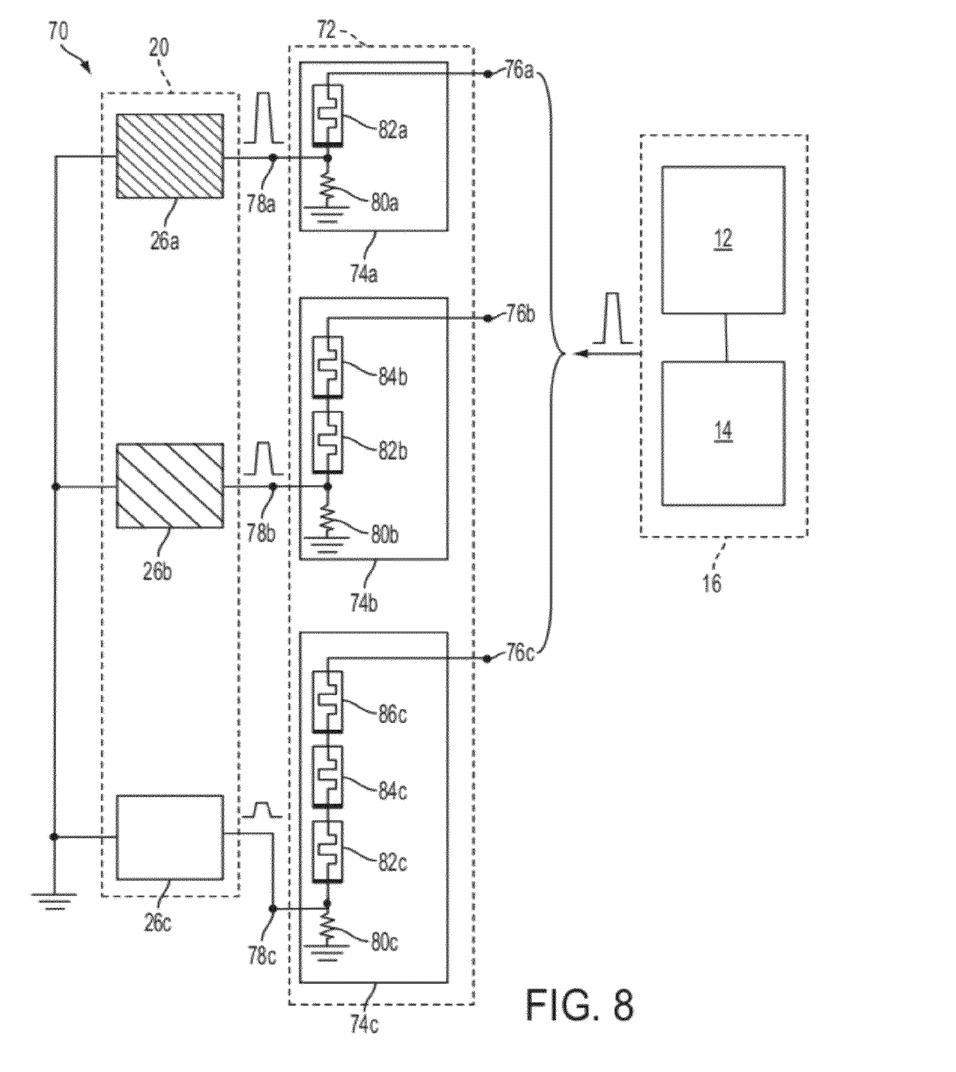
FIG. 8 is a schematic illustration of a pulse generator (event detector and voltage source) and display including a variable characteristic printed voltage dividing circuit, where the variable characteristic is memristance, according to still another embodiment of the present disclosure.

FIG. 8 illustrates yet another circuit 70 in which each voltage pulse causes a change in an electronic component. Circuit 70 comprises a printed voltage dividing circuit 72, which itself comprises plurality of variable characteristic devices, which in this embodiment are memristive circuits 74a, 74b, 74c each communicatively connected via nodes 76a, 76b, 76c to receive a pulse from pulse generator 16. Each memristive circuit 74a, 74b, 74c is communicatively connected to an output node 78a, 78b, 78c, respectively.

Each memristive circuit 74a, 74b, 74c comprises one or more memristive devices connected to a fixed reference resistance. For example, memristive circuit 74a comprises a fixed reference resistance 80a and a single memristor 82a. Memristive circuits 74a, 74b, 74c present an increasing resistance to a pulse from pulse generator 16. Thus, memristive circuit 74b comprises a fixed reference resistance 80b and memristors 82b, 84b, and memristive circuit 74c comprises a fixed reference resistance 80c and memristors 82c, 84c, 86c. Typically, the reference resistances will be equal (i.e., 80a=80b=80c), but such need not necessarily be the case. A three stage printed voltage dividing circuit 72 is shown, although a different number of stages may also be employed depending on the applications of the present disclosure.

Figure 9:
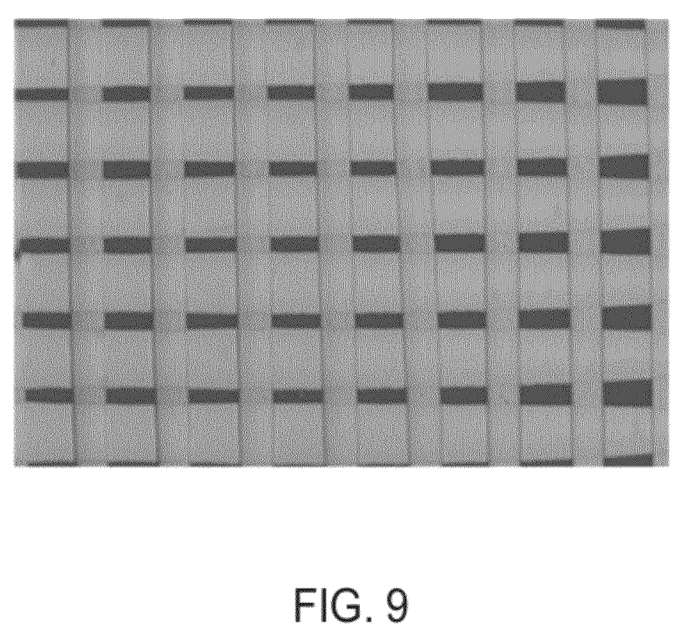
FIG. 9 is a microphotograph of a memristor circuit comprised of cross-bar junctions which may be employed in an embodiment of the present disclosure.
Figure 10:
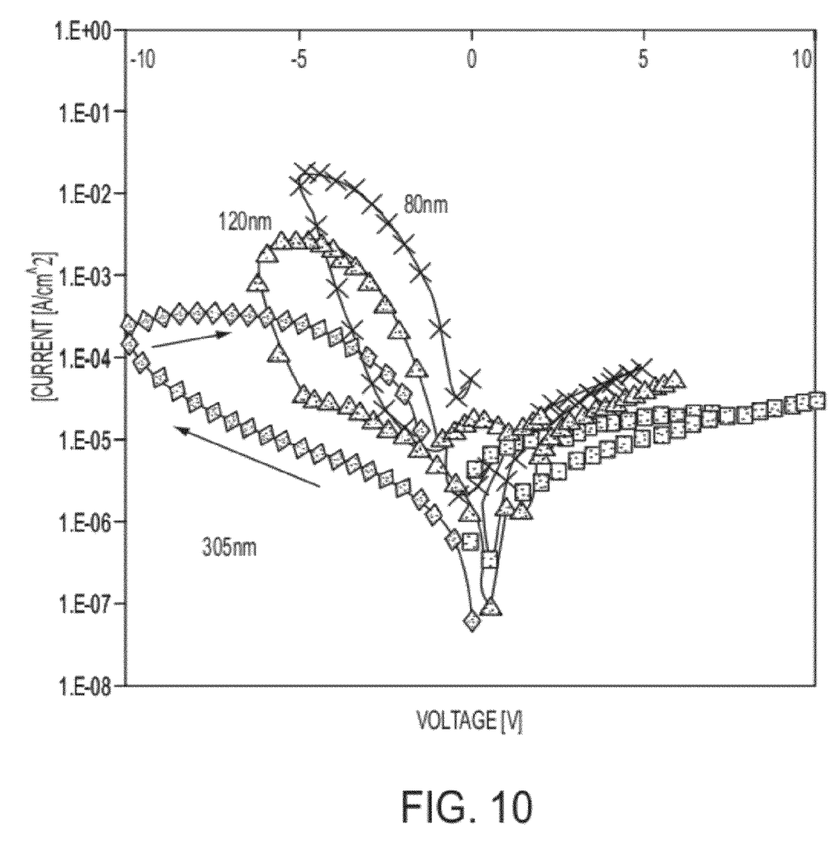
FIG. 10 is a graph of current against voltage for memristors with different dielectric thicknesses.

The resistance M(q) of a memristor is dependent on past input charge with the relationship $I*M(q)=V$, where I is current and V is voltage. In one embodiment, memristors are simple cross-bar junctions, illustrated in FIG. 9, with a dielectric layer sandwiched between metal electrodes. In one embodiment, the dielectric layer is solution-processed titanium dioxide and the metal is printed from silver (Ag) solution. The thickness of the memristor layer, the area of the cross-bar junctions, and the number of memristors can be adjusted, to allow designing for a wide range of dector characteristics (e.g., sensitivity, threshold, etc.) needed for different applications. FIG. 10 is a graph of current against voltage for memristors with different dielectric thicknesses.

Returning to FIG. 8, as a pulse passes through a memristor, its resistance decreases due to charge movement. This change remains when the pulse is removed (hence, memresistance). As another pulse passes through the memristor, its resistance may decrease further. In the memristive voltage dividing circuit 72 of FIG. 8, if a pulse at nodes 76a, 76b, 76c is of sufficient pulse amplitude or pulse width, memristive circuits 74a, 74b, 74c may present a voltage at nodes 78a, 78b, 78c dependent on the resistance of each memristive circuit 74a, 74b, 74c. By providing additional memristors from stage to stage (e.g., one memristor at memristive circuit 74a, two memristors at memristive circuit 74b, and three memristors at memristive circuit 74c), for a pulse having a given pulse amplitude and pulse width the voltage presented at nodes 78a, 78b, 78c decreases from nodes 78a to 78b, and from nodes 78b to 78c. The attached display elements 26a, 26b, 26c may then change contrast, for example, to a greater degree with increasing voltage as between nodes 78a, 78b, 78c. When the display elements 26a, 26b, 26c are electrophoretic, the above-described display of the relative level of node voltages is provided, which may be calibrated against a reference to indicate the number of events (or extend of an event) detected.

The embodiment shown in FIG. 8 and described above can be generalized to a threshold detection circuit. The conductance of the memristive circuit "jumps" up when a sufficient input flux has been reached. Changes to the memristance can be obtained by accumulating pulses or by spending a certain time period at a fixed voltage, such as when used in a timer application. Such applications rely on the non-linear rise in memristor conductance, and the increase in current may be on the order of 100-times after even relatively short voltage application times. The required switching time can be adjusted by varying the applied voltage, the memristor dielectric thickness, or the number of junctions placed in series.

The physics of modern electrical devices and the methods of their production are not absolutes, but rather statistical efforts to produce a desired device and/or result. Even with the utmost of attention being paid to repeatability of processes, variations and imperfections result. Accordingly, no limitation in the description of the present disclosure or its claims can or should be read as absolute. Each of the above examples are provided to illustrate various facets of the present disclosure. The limitations of the claims, not the examples in this description section, are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

Furthermore, while a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. For example, the output of the voltage dividing circuits described herein may be to a processing circuit comprising one or more processing elements, as opposed to display element as shown, for various forms of signal processing. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed:

1. A method of indicating the occurrence of a sensed event, comprising:
   sensing an event at an event detector;
   producing a voltage pulse in response to said sensed event;
   providing said voltage pulse to a printed voltage dividing circuit, said printed voltage dividing circuit divided into a plurality stages, each said stage having an input node connected to receive said voltage pulse, an output node, and a voltage passing circuit electrically connecting said input node and said output node of said stage; and providing a voltage at said output node of each said stage to a processing circuit, which uses said voltage at said output node of each said stage to indicate the occurrence of a sensed event;

wherein said processing circuit comprises a plurality of individually addressable display elements, each said individually addressable display element communicatively coupled to one of said output nodes such that the voltage on said output node may change a characteristic of said communicatively coupled display element in accordance with said voltage pulse; and further wherein the occurrence of said sensed event is indicated by way of display characteristics of said plurality of individually addressable display elements.

2. The method of claim 1, wherein said characteristic of said plurality of individually addressable display elements is a visual contrast of said individually addressable display elements, and said individually addressable display elements together provide a grey-scale display.

3. A method of indicating the occurrence of a sensed event, comprising:

sensing an event at an event detector;

producing a voltage pulse in response to said sensed event;

providing said voltage pulse to a printed voltage dividing circuit, said printed voltage dividing circuit comprising a plurality stages, each said stage having an input node, an output node, and a voltage passing circuit electrically connecting said input node and said output node of said stage in response to said voltage pulse;

providing a voltage at said output node of each said stage to at least one of a plurality of individually addressable display elements such that the voltage may change a characteristic of said display element in accordance with said voltage pulse; and indicating by way of said display characteristics of said plurality of individually addressable display elements the occurrence of a sensed event;

wherein said individually addressable display elements are variable visible contrast display elements, and further wherein said indicating comprises displaying said variable visible contrast display elements with varying contrast levels depending upon the extent of the occurrence of said sensed event.

4. The method of claim 3, wherein said individually addressable display elements together provide a grey-scale display.

5. The method of claim 3, wherein sensing said event and producing said voltage pulse occur within a single printed electronic element.

6. The method of claim 5, wherein said sensing and said producing said voltage pulse are accomplished by an element having a property selected from the group consisting of: piezoelectricity, pyroelectricity, optoelectricity, magnetoelectricity, bioelectricity, and chemoelectricity.

7. The method of claim 3, wherein each stage comprises an individual threshold devices, each said threshold device connected to a unique one of said individually addressable display elements for driving said connected individually addressable display element in response to said detection of an event by way of said display driving signal.

8. The method of claim 7, wherein said individual threshold devices are resistive devices connected to one another in series, and wherein said output nodes are located at least between said individual threshold devices such that each said node is provided with a stepped down voltage as compared to a prior node as a function of the resistance value at each node.

9. The method of claim 7, wherein each said individual threshold device comprises:

a variable characteristic device;

said variable characteristic device connected in parallel with the variable characteristic device of each other individual threshold device; and a single pulse issued by said pulse generator changes the variable characteristic of at least two of said of connected variable characteristic devices by a different amount.

10. The method of claim 9, wherein a voltage is provided at a first node connected to one of said display elements, and a voltage pulse is provided by said event detector at a second node connected to said variable characteristic device such that said voltage pulse changes the variable characteristic of said variable characteristic device and thereby modulates the voltage provided to said display element connected to said first node.

11. The method of claim 10, wherein said change in variable characteristic of said variable characteristic device in response to said voltage pulse is unchanged upon termination of said voltage pulse, and furthermore said change in variable characteristic is cumulative of a plurality of such pulses applied to said variable characteristic device.

\* \* \* \* \*